2. Sheets. Sheet. 1

C. O. Greene,

Reservoir Cook Stove.

No. 4,161. Reissued Oct. 25. 1870.

Witnesses.

J. S. Barney

A. S. Reille

Inventor.

Chauncey O. Greene

By Richard G. Reille his Attorney.

C. O. Greene, 2. Sheets. Sheet. 2.

Reservoir Cook Stove.

No. 1,161. Reissued Oct. 25. 1870.

Witnesses.

J. L. Barney

A. S. Rille

Inventor.

Chauncey O. Greene

By Richard H. Rille his Attorney.

United States Patent Office.

CHAUNCEY O. GREENE, OF TROY, NEW YORK.

Letters Patent No. 88,160, dated March 23, 1869; reissue No. 4,161, dated October 25, 1870.

IMPROVEMENT IN WATER-RESERVOIRS FOR COOKING-STOVES.

The Schedule referred to in these Letters Patent and making part of the same.

I, CHAUNCEY O. GREENE, of the city of Troy, county of Rensselaer and State of New York, have invented certain new and useful Improvements in Water-Reservoirs for Cooking-Stoves and Ranges, of which the following is a specification.

The nature of my said invention consists in locating and arranging the water-reservoir or tank at the front end of the stove or range, directly under the hearth-plate, and suspending it therefrom, and in combination therewith, in such manner that the said hearth-plate shall form a top-covering for the said water-reservoir or tank, and by means of apertures in and through the said hearth-plate, access be had to the interior of said water-reservoir or tank for the purpose of filling, and also of taking water therefrom; and It also consists in the covering of the said apertures with proper valves, trap-doors, lids, or covers, forming a combination with said hearth-plate and water-reservoir or tank to properly close and cover the same when requisite.

The said removable covers, lids, or valves may be flush with the surface of the hearth-plate, or slightly elevated above, as may be found most convenient, and they may also be hinged to said hearth-plate, or not, as deemed best by the manufacturer.

It also consists in forming the front end or wall of the stove, at and below the above-mentioned hearth-plate, by one side or wall of the reservoir or tank, and the combination of the said reservoir or tank with the stove in an intimate, compact, and strong manner, whereby is formed a reservoir cooking-stove or range of a less number of plates or castings than heretofore required; and It also consists in the heating of the said water-tank or reservoir by means of a flue-space, chamber, or the equivalent thereof, formed, constructed, or situated between the reservoir or tank and the front wall of the oven of the stove. The said flue-space or chamber communicating with the flues of the stove so that the products of combustion may be brought in direct contact with the wall or side of the reservoir or tank, thereby heating the same and its contents. This flue-space, chamber, or the equivalent thereof, being also for the further object and purpose of keeping the heat within the stove-oven, and of preventing its being cooled off when fresh or cold water is put in the reservoir or tank.

*Description of the Accompanying Drawing.*

The same letters refer to like parts in each of the said figures.

*General Description.*

Figure 1:
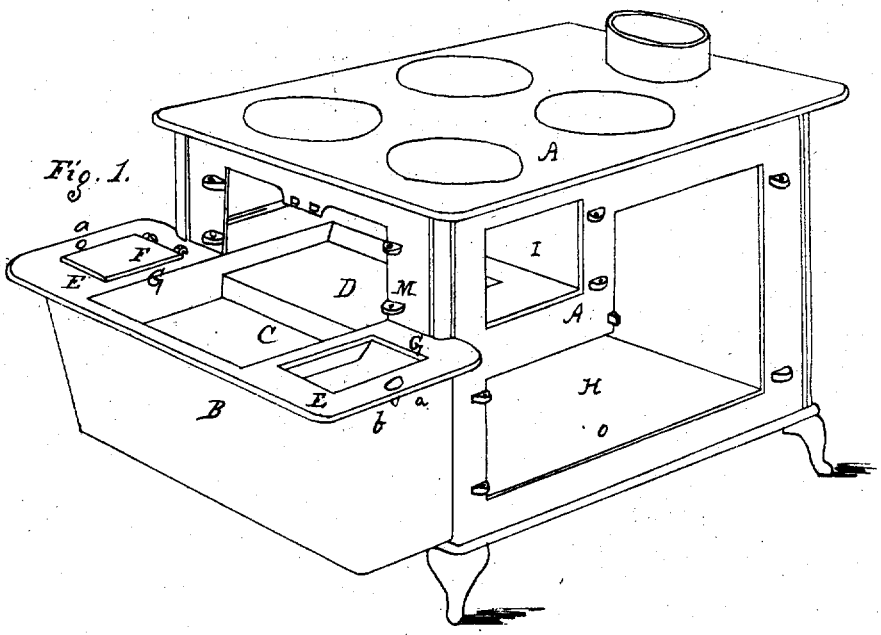
Figure 1 is a perspective view of a cooking-stove embodying my improvement or invention.

The stove or range is constructed with diving-flues, and an oven in the usual manner, excepting that part under the hearth-plate and next adjoining the oven thereof.

The hearth-plate is constructed about as usual in such stoves, and is placed at any convenient height; and I have usually an ash-pit connected therewith, or cast in one piece, about as shown in the drawing. The front of the stove below the hearth-plate is open.

A water-reservoir or tank, B, is made of suitable material, formed so as to fit snug and close all around under the hearth-plate, its upper edge joining thereto, and its back wall next to the stove fitting close against the opening in the stove below the hearth-plate, closing it up, so that the said wall of the reservoir forms the front wall of the stove proper; and it is also provided with holding-lugs *a a* at each end thereof, which are perforated to receive holding-bolts *b b*.

This reservoir or tank B, after first having its joining-places at or under the hearth-plates, and also the reservoir-top edges properly coated with suitable cement to make water-tight joints, is then adjusted in position, its back bottom edge resting upon the front edge of the bottom plate of the stove, and it is then secured firmly and permanently in such suspended position from under the hearth-plates E by means of the bolts and nuts *b b*, in manner substantially as shown.

Figure 2:
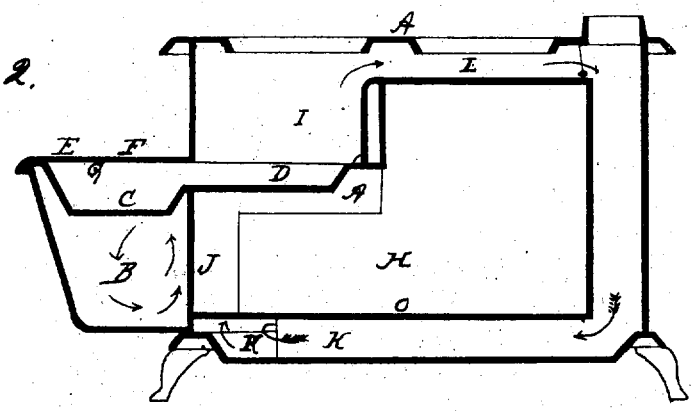
Figure 2 is a longitudinal vertical section of fig. 1.
Figure 3:
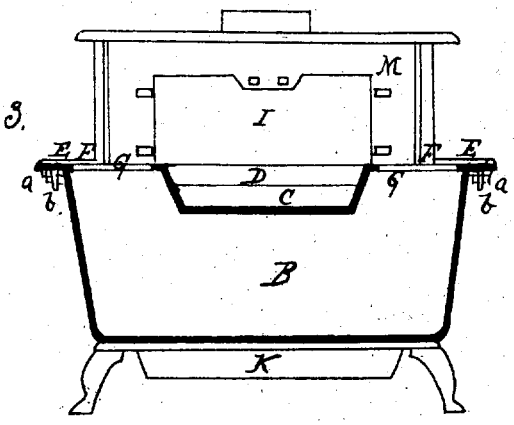
Figure 3 is a transverse vertical section through the water-reservoir or tank.
Figure 4:
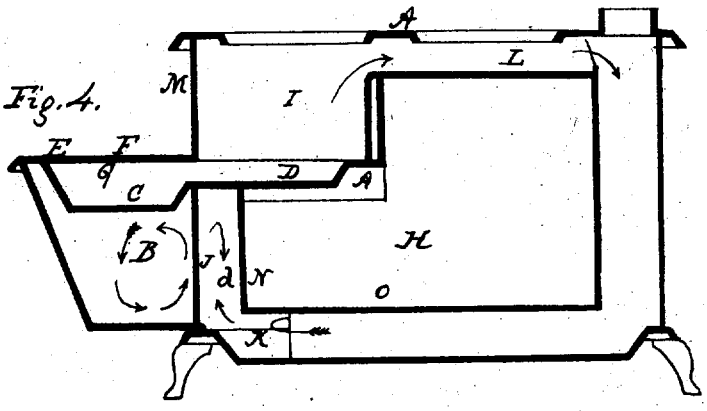
Figure 4 is a vertical longitudinal section, showing a heating-chamber or flue-space next the water-reservoir's side.

The water-reservoir or tank B thus forms directly, by its wall J, the end or front wall of the stove, and, as shown in fig. 2, of the oven, the oven bottom plate *o* and top plate also reaching thereto and joining therewith, and then the reservoir is heated mainly by heat radiated from the oven; and, when constructed as shown in fig. 4, the reservoir is heated by means of a flue-space or chamber formed between its wall J and the front wall of the oven N. This flue-space or chamber is constructed and located for the purpose of heating said reservoir or tank, and also to prevent the cooling of the oven when fresh or cold water is added to the reservoir.

In fig. 2 the oven reaches or extends forward to the reservoir, and one wall of the reservoir J forming the front wall of the oven, and in fig. 4 a flue or chamber intervenes, as above described.

One or more openings are formed through the hearth-plate E, which gives access to the interior of the water-reservoir or tank, to put in and take out water therefrom.

The openings G are provided with either removable covers or hinged lids F, which, when closed, form a part of the hearth-plate's level surface, or, as shown in fig. 1, they may be elevated above, to suit the convenience of the manufacturer.

As this water-reservoir or tank B is located wholly below the hearth-plate E, suspended therefrom, and in combination therewith, and forward of the fire-box or chamber of combustion I, the water therein (when constructed as shown in fig. 2) is heated by the radiation of heat from the oven H to the reservoir wall or side J, which practically causes a continuous rising current of warm water at and near the reservoir's side J, in manner about as shown by the arrows in the drawing, until the water therein is equally heated; and when constructed as shown in fig. 4 of the annexed drawing, and hereinbefore described, the heating-chamber or flue-space, or its equivalent, *d*, makes combination with the bottom flue-space K, in manner so that the products of combustion and heat from the flues rise and fill said chamber or flue *d*, and strike or impinge directly on or against the side of the reservoir J, which thus heats the water therein, having the same effect on the water as when heated from the oven H, as before described.

In the construction of fig. 4 the cooling of the oven is prevented, (when fresh water is added to the interior of the reservoir,) as might be the case when the oven and reservoir are in too intimate connection.

I form the part of my ash-pit situated outside of the stove proper wholly within my reservoir, as shown in the accompanying drawing, the reservoir walls surrounding the same, and the hearth-plate forming the top-plate of both ash-pit and reservoir.

It is obvious that I need not confine myself to exactly this construction or location of the ash-pit, as my reservoir, and its combination and connection with the stove is independent thereof, as the front wall and the end walls of the reservoir do not come in contact with the ash-pit.

The part of the ash-pit in the upper part of the reservoir is an outward extension of the ash-pit under the fire-pot, the bottom of which is marked D, and the outward extension thereof marked C.

Having thus described my invention,

What I claim, and desire to secure by Letters Patent of the United States, is—

1. In combination with a cooking-stove or range the location and suspension of a hot-water reservoir or tank, B, from below or under the hearth-plate E, and next to or adjoining the oven H or heating-chamber *d*, in manner substantially as hereinbefore described and shown, for the purpose set forth.

2. In cooking-stoves or ranges, the combination and attachment of the water-reservoir or tank with and to the hearth-plate E, when extended outward from below the fire-grate or fire-place I, in manner so as to form a covering for the top of said reservoir B, and also to hold and support the same in permanent suspended position from thereunder, substantially as herein set forth.

3. The opening or openings G, or their equivalent, through the hearth-plate E, to give access to the interior of the reservoir or tank B, provided with suitable covers or valves F, for closing the same when required.

4. Forming the end wall or side of a cooking-stove or range below the hearth-plate E and ash-pit C, and next the oven H, or heating-chamber *d*, by means of a water-reservoir or tank side J, when arranged in combination, substantially as described and shown.

5. As arranged with a diving-flue cooking-stove or range, the combination of the hearth-plate E and water-reservoir or tank B when suspended therefrom as described, with the heating-chamber *d*, oven H, and oven bottom flue-space K, in manner as herein shown and for the purpose set forth.

CHAUNCEY O. GREENE.

Witnesses:
WM. H. H. SAUNDERS,
RICHARD H. REILLE.